(12) United States Patent
Madhavan (10) Patent No.: US 8,180,674 B2
(45) Date of Patent: *May 15, 2012

(54) TARGETING OF ADVERTISEMENTS BASED ON MUTUAL INFORMATION SHARING BETWEEN DEVICES OVER A NETWORK

(75) Inventor: Anand Madhavan, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1216 days.

This patent is subject to a terminal disclaimer.

(21) Appl. No.: 11/542,874

(22) Filed: Oct. 3, 2006

(65) Prior Publication Data

US 2008/0082413 A1 Apr. 3, 2008

(51) Int. Cl.
*G06Q 30/00* (2006.01)
(52) U.S. Cl. ................................................. 705/14.49
(58) Field of Classification Search .............. 705/14.49
See application file for complete search history.

(56) References Cited

U.S. PATENT DOCUMENTS

| | | | | |
|---|---|---|---|---|
| 2004/0225562 | A1* | 11/2004 | Turner | 705/14 |
| 2006/0069616 | A1* | 3/2006 | Bau | 705/14 |
| 2006/0277108 | A1* | 12/2006 | Altberg et al. | 705/14 |

* cited by examiner

*Primary Examiner* — Daniel Sorkowitz
(74) *Attorney, Agent, or Firm* — Stattler-Suh PC (57) ABSTRACT

A system and method to facilitate targeting of advertisements based on mutual information sharing between devices over a network are described. Users access an entity over a network and further initiate various events, which are subsequently captured by selective processing servers within the network-based entity. Each of such events or actions initiated by the user is associated with one or more categories and is further stored within the entity along the respective categories. Subsequently, if the user connects to one or more media devices, and the media devices are coupled to the entity via the network, then the entity selects advertisements to be displayed within the viewing area of the media device, such that each advertisement is related to the stored events or actions and their respective categories. Alternatively, a user connects to one or more media devices and further performs specific actions. The actions are then transmitted to the entity via the network and are stored within the entity along with respective categories associated with each user action. Subsequently, if the user connects to the entity through a client machine and through the network, the entity selects advertisements to be displayed within the display area of the client machine along with content information requested by the user, such that each selected advertisement is related to the previously stored events or actions and their respective categories.

15 Claims, 12 Drawing Sheets

TARGETING OF ADVERTISEMENTS BASED ON MUTUAL INFORMATION SHARING BETWEEN DEVICES OVER A NETWORK

TECHNICAL FIELD

The present invention relates generally to the field of network-based communications and, more particularly, to a system and method to facilitate targeting of advertisements based on mutual information sharing between devices over a network, such as the Internet.

BACKGROUND OF THE INVENTION

The explosive growth of the Internet as a publication and interactive communication network has created an electronic environment that is changing the way business is transacted. As the Internet becomes increasingly accessible around the world, users need efficient tools to navigate the Internet and to find content available on various websites.

Internet portals provide users an entrance and guide into the vast resources of the Internet. Typically, an Internet portal provides a range of search, email, news, shopping, chat, maps, finance, entertainment, and other content and services. The Internet portal further provides advertising information supplied by advertising entities, which target the users of the portal. Thus, it would be advantageous if the information presented to the users is efficiently and properly categorized and stored within the portal and the advertising information closely matches interests of the users and activities performed by the users within the Internet.

SUMMARY OF THE INVENTION

A system and method to facilitate targeting of advertisements based on mutual information sharing between devices over a network are described. In some embodiments described in detail below, users access an entity, such as, for example, a content service provider or network portal, over a network, such as the Internet, and further initiate various events, which are subsequently captured by selective processing servers within the network-based entity.

Each of such events or actions initiated by the user is associated with one or more categories and is further stored within the entity along with the respective categories. Subsequently, if the user connects to one or more media devices, such as, for example, a network-enabled television set and/or a digital video recording device, and the media devices are coupled to the entity via the network, then the entity selects advertisements to be displayed within the viewing area of the respective media device, such that each advertisement is related to the stored events or actions and their respective categories.

In alternate embodiments described in detail below, a user connects to one or more media devices and further performs specific actions, such as, for example, watches a broadcast television program on the network-enabled television set or watches a television program which has been previously recorded onto the digital video recording device. The actions are transmitted to the entity via the network and are stored within the entity along with respective categories associated with each user action.

Subsequently, if the user connects to the entity through a client machine and through the network, then the entity selects advertisements to be displayed within the display area of the client machine along with content information requested by the user, such that each selected advertisement is related to the previously stored events or actions and their respective categories.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

In the following description, numerous details are set forth for purpose of explanation. However, one of ordinary skill in the art will realize that the invention may be practiced without the use of the specific details. In other instances, well-known structures and devices are shown in block diagram form in order not to obscure the description of the invention with unnecessary detail.

In some embodiments described in detail below, users access an entity, such as, for example, a content service provider or network portal, over a network, such as the Internet, and further input various data, which is subsequently captured by selective processing servers within the network-based entity.

In one embodiment, data includes multiple events performed within one or more user search and navigation sessions. In one embodiment, a user search and navigation session encompasses activity that a user entity with a unique Internet Protocol (IP) address, such as, for example, a user or an agent of the user, performs in a predetermined period of time, which activity may or may not overlap with previous sessions associated with the same user.

In one embodiment, an event is a type of action initiated by the user, typically through a conventional mouse click command. Events include, for example, advertisement clicks, search queries, search clicks, sponsored listing clicks, page views and advertisement views. However, events, as used herein, may include any type of online navigational interaction or search-related events.

Generally, a page view event occurs when the user views a web page. In one example, a user may enter a web page for music within an Internet portal by clicking on a link for the music category page. Thus, a page view event is classified as the user's view of the music category page. In one embodiment, the page view event may be classified by the text occurring on the web page. In addition, the co-occurrence or sequence of page view events may be used to classify a set of page view events.

An advertisement view event occurs when the user views a web page for an advertisement. For example, an Internet portal may display banner advertisements on the home page of the portal. If the user clicks on the banner advertisement, the portal redirects the user to the link for the corresponding advertiser. The display of a web page, in response to the conventional mouse click command, constitutes an advertisement click event. A user may then generate multiple page view events by visiting multiple web pages at the advertiser's web site.

An advertisement click event occurs when a user clicks on an advertisement. For example, a web page may display a banner advertisement. An advertisement click event occurs when the user clicks on the banner advertisement.

A search query event occurs when a user submits one or more search terms within a search query to a web-based search engine. For example, a user may submit the query "Madonna Music CD", and a corresponding search query event containing the search terms "Madonna," "music," and "CD" is recorded. In response to a user query, a web-based search engine returns a plurality of links to web pages relevant to the corresponding search query terms. If a user clicks on one of the links, a search click event occurs.

A sponsored listing advertisement refers to advertisements that are displayed in response to a user's search criteria. A sponsored listing click event occurs when a user clicks on a sponsored listing advertisement displayed for the user.

Each of such events or actions initiated by a user is associated with one or more classification categories and is further stored within the entity along the respective categories, as described in further detail below. Subsequently, if the user connects to one or more media devices, such as, for example, a network-enabled television set and/or a digital video recording device, and the one or more media devices are coupled to the entity via the network, then the entity selects advertisements to be displayed within the viewing area of the respective media device, such that each advertisement is related to the previously stored events or actions and their respective classification categories.

In alternate embodiments described in detail below, a user connects to one or more media devices and further performs specific actions or activities, such as, for example, watches a broadcast television program on the network-enabled television set or watches a television program which has been previously recorded onto the digital video recording device. The actions are transmitted to the entity via the network and are stored within the entity along with respective classification categories associated with each user action, as described in further detail below.

Subsequently, if the user connects to the entity via a client machine and via the network, then the entity selects advertisements to be displayed within the display area of the client machine in conjunction with content information requested by the user, such that each selected advertisement is related to the stored events or actions and their respective classification categories.

Generally, content information is presented to the user in a variety of formats, such as, for example, text, images, video, audio, animation, program code, data structures, hyperlinks, and other formats. In addition, as used herein, advertising information includes multiple advertisements, which may include a hyperlink, such as, for example, a sponsor link, an integrated link, an inside link, or other known link. The format of an advertisement may or may not be similar to the format of the content displayed for the user and may include, for example, text advertisements, graphics advertisements, rich media advertisements, and other known types of advertisements.

Figure 1:
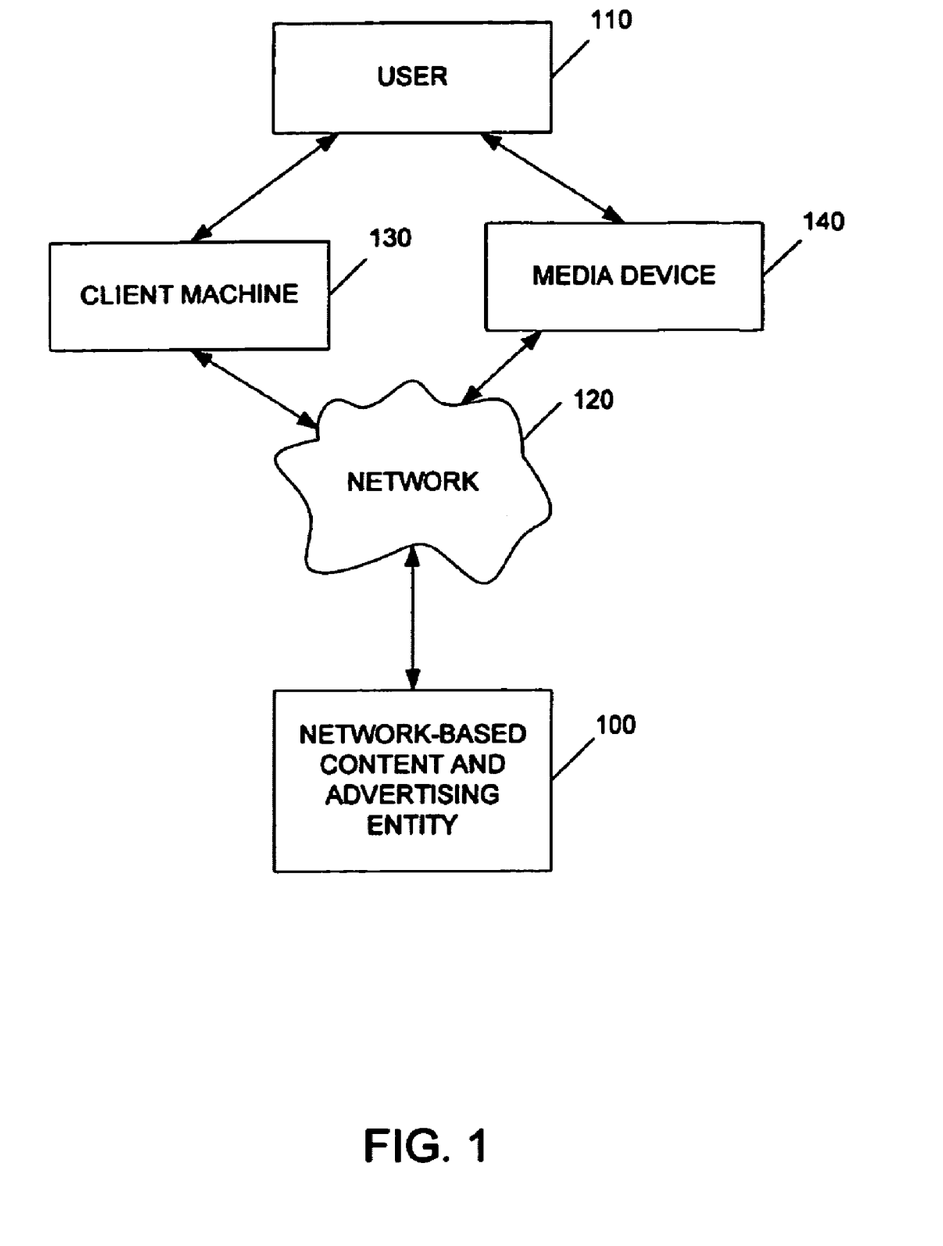
FIG. 1 is a block diagram illustrating a conventional network architecture.

FIG. 1 is a block diagram illustrating a conventional network architecture. While an exemplary embodiment of the present invention is described within the context of a network-based content and advertising entity 100 enabling automatic matching of advertising information to events or actions and interests of users, it will be appreciated by those skilled in the art that the invention will find application in many different types of computer-based, and network-based, entities, such as, for example, commerce entities, content provider entities, or other known entities having a presence on the network.

As illustrated in FIG. 1, an entity 100 is coupled via a network 120 to one or more user entities 110, such as, for example, users and/or agents of such users. The user entities 110 are coupled to the network 120 through a client machine 130 and/or at least one media devices 140, as described in further detail below.

Figure 2:
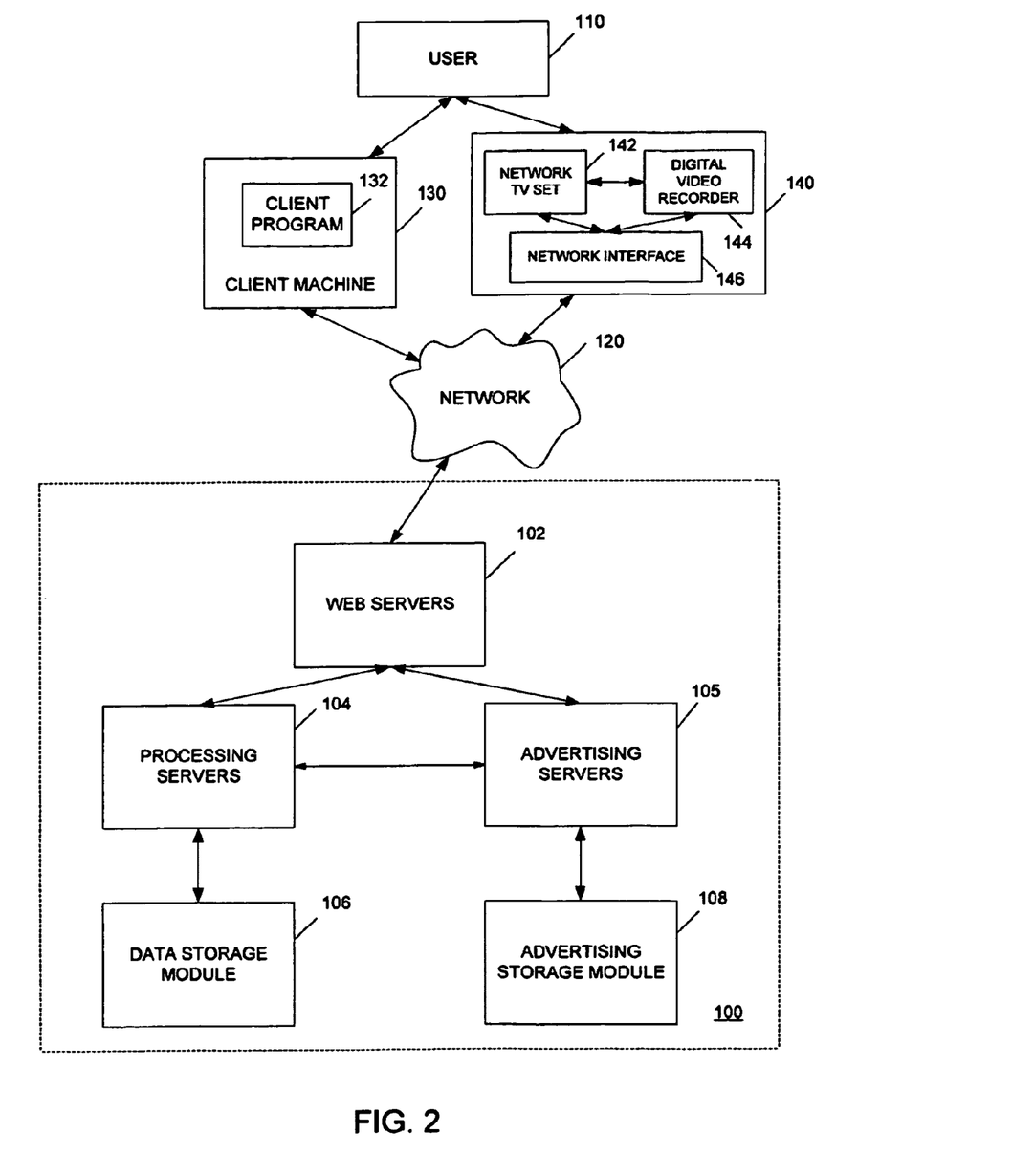
FIG. 2 is a block diagram illustrating an exemplary network-based entity within the network architecture, according to one embodiment of the invention.

FIG. 2 is a block diagram illustrating an exemplary network-based entity within the network architecture, according to one embodiment of the invention.

In one embodiment, the network-based content and advertising entity 100 is a network content service provider, such as, for example, an Internet portal like Yahoo! and its associated properties, and includes one or more front-end web servers 102, which may, for example, deliver web pages to multiple users, (e.g., markup language documents), handle search requests to the entity 100, provide automated communications to/from users of the entity 100, deliver images to be displayed within the web pages, deliver content information to the users in various formats, and deliver advertising information to the users.

The entity 100 further includes one or more back-end servers, for example, one or more processing servers 104 and one or more advertising servers 105. Each server maintains and facilitates access to one or more storage modules such as, for example, a data storage module 106 coupled to the processing servers 104 to store data related to the users, and an advertising storage module 108 coupled to the advertising servers 105 to store advertisements to be transmitted and displayed for users over the network 120. In one embodiment, the advertising servers 105 are configured to transmit and receive content, such as, for example, advertisements, sponsored links, integrated links, and other types of advertising content, to/from advertiser entities (not shown) via the network 120.

The network-based entity 100 may be accessed by a client program 132, such as a browser (e.g., the Internet Explorer™ browser distributed by Microsoft Corporation of Redmond, Wash., Netscape's Navigator™ browser, the Mozilla™ browser, a wireless application protocol enabled browser in the case of a cellular phone, a PDA or other wireless device), that executes on a client machine 130 coupled to one or more user entities 110 and accesses the entity 100 via a network 120, such as, for example, the Internet. Other examples of networks that a client may utilize to access the entity 100 includes a wide area network (WAN), a local area network (LAN), a wireless network (e.g., a cellular network), a virtual private network (VPN), the Plain Old Telephone Service (POTS) network, or other known networks.

In one embodiment, other network entities may also access the network-based entity 100 via the network 120, such as, for example, publisher entities (not shown), which communicate with the web servers 102 to populate web pages transmitted by the web servers 102 to the user entities 110 with appropriate content information, advertiser entities (not shown), which communicate with the web servers 102 and the advertising servers 104 to transmit advertisements to be displayed for the user, and broadcast television entities (not shown), which broadcast television programs to the user entities 110.

In one embodiment, the network-based entity 100 may also communicate with one or more media devices via the network 120, for example, with a network-enabled television set 142, such as an Internet TV set, which may or may not be coupled to a digital video recording device 144. In an alternate embodiment, both the network-based television set 142 and the digital video recording device 144 are coupled to the entity 100 via the network 120 and a network interface module 146.

Figure 3:
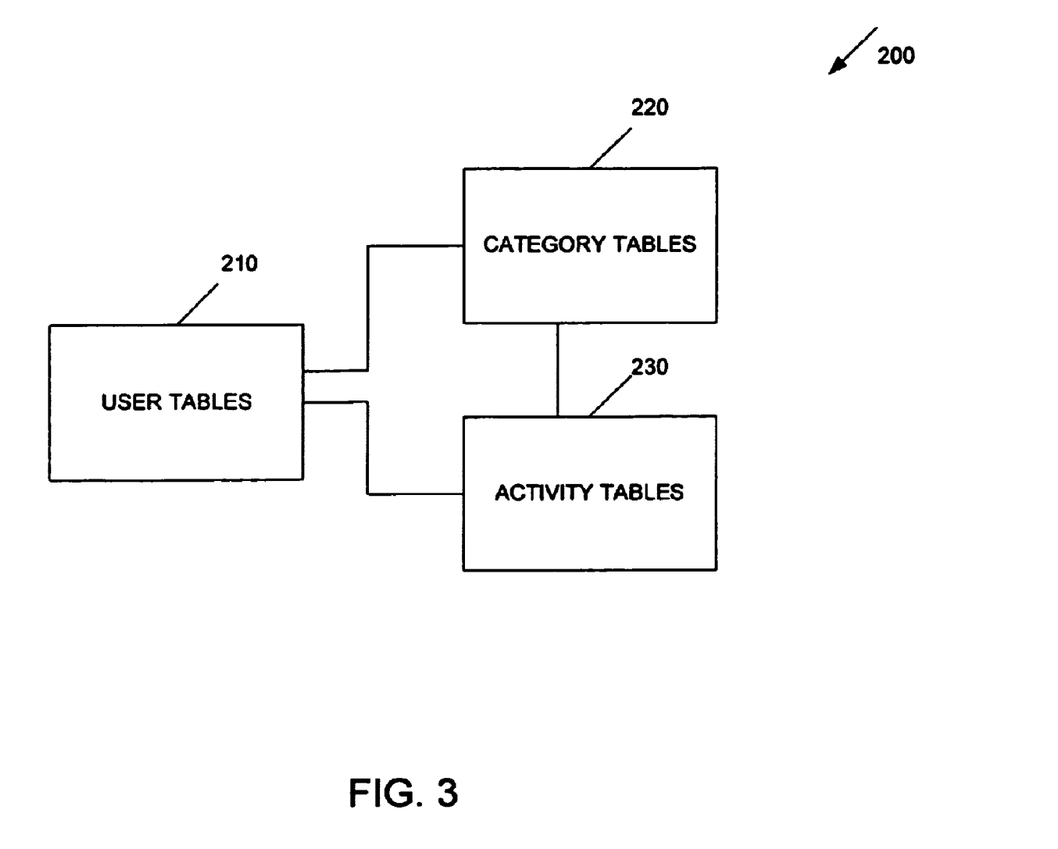
FIG. 3 is a block diagram illustrating a data storage module within the network-based entity, according to one embodiment of the invention.

FIG. 3 is a block diagram illustrating a data storage module within the network-based entity, according to one embodiment of the invention. As illustrated in FIG. 3, in one embodiment, the data storage module 106 may be a database, which at least partially implements and supports the network-based entity 100. The database 200 shown in FIG. 3 may be implemented as a relational database, and may include a number of tables having entries, or records, that are linked by indices and keys. Alternatively, the database 200 may be implemented as collection of objects in an object-oriented database, a distributed database, or any other databases.

As illustrated in FIG. 3, in one embodiment, the exemplary database 200 includes multiple tables, of which tables specifically provided to enable an exemplary embodiment of the invention, namely user tables 210, category tables 220, and event or activity tables 230, are shown.

In one embodiment, the user tables 210 contain a record for each user 110 of the entity 100, such as, for example, a user profile containing user data which may be linked to multiple items stored in the other tables 220 and 230 within the database 200, such as, for example, user identification information, user account information, and other known data related to each user 110. The user identification information may further include a user profile containing demographic data about the user 110, geographic data detailing user access locations, behavioral data related to the user 110, such behavioral data being generated by a behavioral targeting system, which analyzes user activities in connection with the entity 100, and other identification information related to each specific user 110. In one embodiment, the stored data may also include near short term behavior of the user, or, in the alternative, long term behavior of the user or an algorithmic combination of short term and long term behavior of the user.

In one embodiment, the event or activity tables 230 may contain, for example, records of events or other actions performed by the user 110 while accessing the network 120, and the category tables 220 may contain, for example, multiple classification categories used to group the events or activities performed by the user 110. For example, a "MUSIC" category stored within the tables 220 may be linked to various music-related events or activities stored within the tables 230 and may also be linked to a user profile stored within the user tables 210.

It is to be understood that the database 200 may include any of a number of additional tables, which may also be shown to be linked to the user tables 210, the category tables 220, and the user event/activity tables 230, such as, for example, page tables, which store web page information related to the web pages transmitted to the user, or content tables, which store content information related to the stored web pages.

Figure 4:
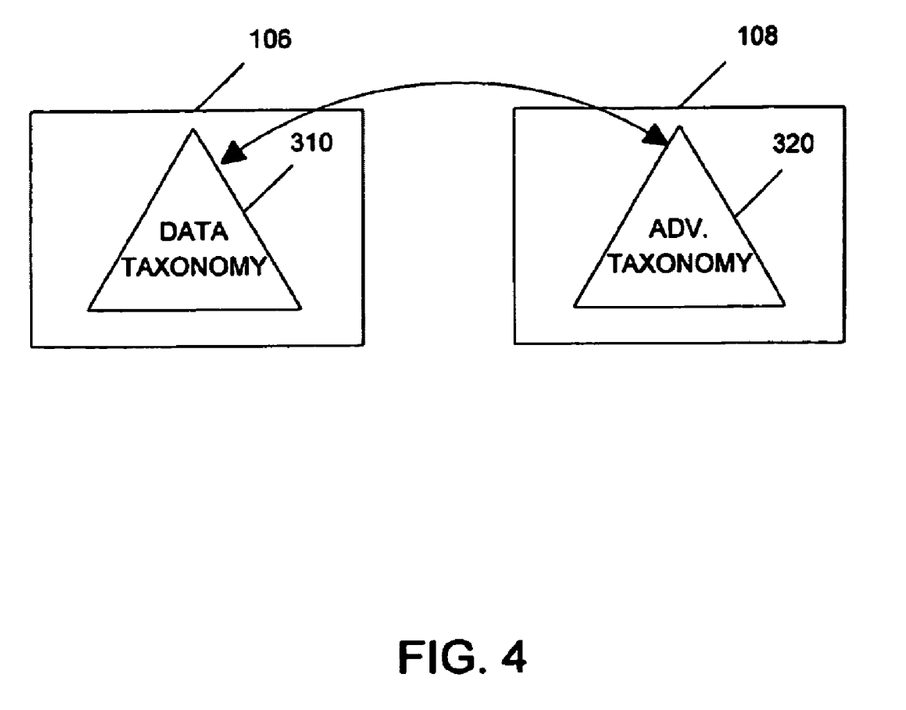
FIG. 4 is a block diagram illustrating a taxonomy architecture within the network-based entity, according to an alternate embodiment of the invention.

FIG. 4 is a block diagram illustrating a taxonomy architecture within the network-based entity, according to an alternate embodiment of the invention. As shown in FIG. 4, in the alternate embodiment, both the data storage module 106 and the advertising storage module 108 may further include one or more respective taxonomies, such as, for example, a data taxonomy 310 stored within the data storage module 106 and a respective advertising taxonomy 320 stored within the advertising storage module 108.

In one embodiment, the data storage module 106 stores events and activities organized into a hierarchical data taxonomy 310 based on multiple categories, such that events in the same classification category are mapped closer together, either manually or automatically. The mapping assigns each stored event to one or more categories, the events being subsequently stored within the data taxonomy 310 at respective nodes associated with each corresponding category. For example, the taxonomy of stored categories may comprise a high-level category for "cities," and several sub-categories, located hierarchically below the "cities" category, and illustrating different objectives associated with each particular city, such as, for example, "restaurants," "parks," "city services."

However, it is to be understood that any other representation of a taxonomy used to classify subject matter may be used in conjunction with the embodiments described below without deviating from the spirit or scope of the invention. In addition, in an alternate embodiment, the assigned classification categories may not be mapped into a hierarchical taxonomy and may instead be stored as a collection of categories within the data storage module 106.

Similarly, in one embodiment, the advertising storage module 108 stores advertisements organized into a hierarchical advertising taxonomy 320 based on multiple categories and advertisement parameters, such as, for example, text of each advertisement offer, the advertiser entity associated with each respective advertisement, advertiser industry, and other features of the stored advertisements. The mapping assigns each advertisement to one or more categories, the advertisements being subsequently stored within the advertising taxonomy 320 at respective nodes associated with each corresponding category. In one embodiment, data stored within the data taxonomy 310 may be mapped into corresponding advertisements stored within the advertising taxonomy 320 to enable retrieval of advertisements related to specific events and activities.

Figure 5:
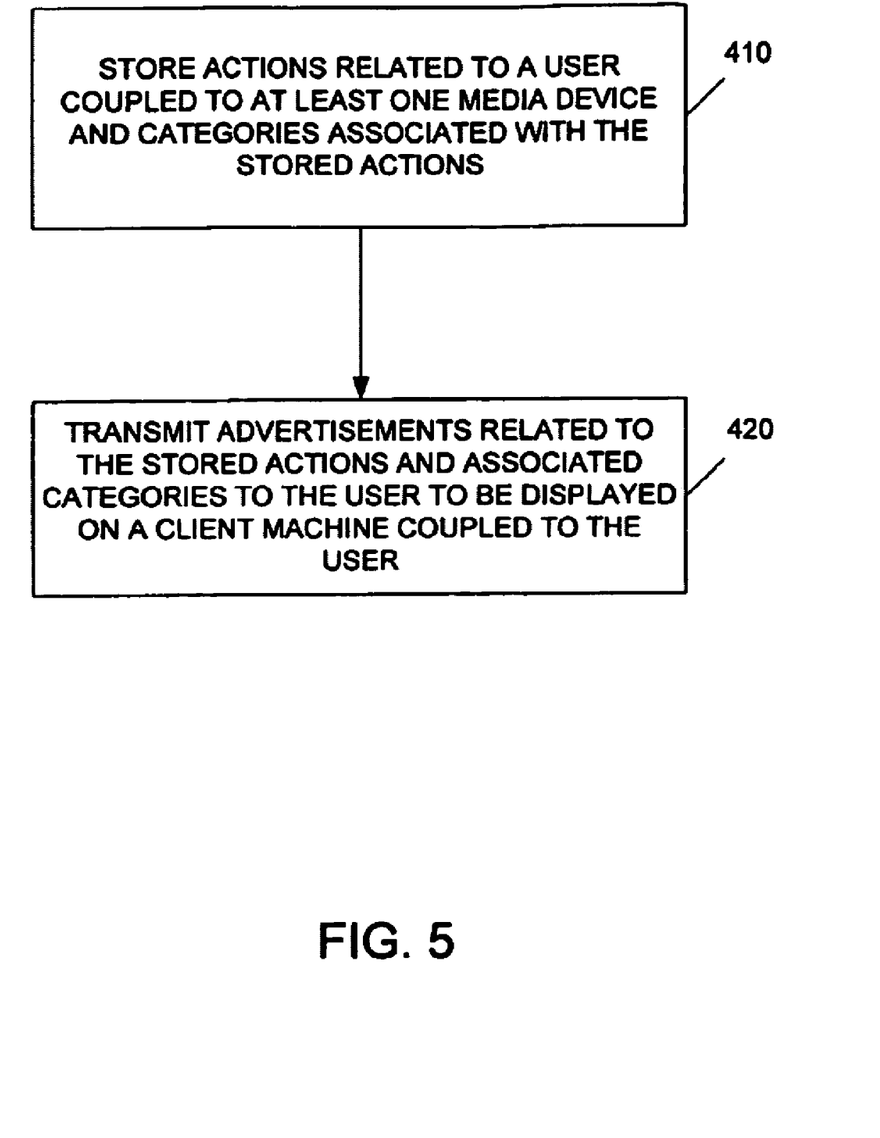
FIG. 5 is a flow diagram illustrating a method to facilitate targeting of advertisements based on mutual information sharing between devices over a network, according to one embodiment of the invention.

FIG. 5 is a flow diagram illustrating a method to facilitate targeting of advertisements based on mutual information sharing between devices over a network, according to one embodiment of the invention. As shown in FIG. 5, at processing block 410, events or actions related to a user 110 coupled to at least one media device 140 and categories associated with the user actions are stored within the data storage module 106 of the entity 100.

In one embodiment, the user 110 coupled to the network-enabled television set 142 and/or the digital video recording device 144 performs various activities, such as, for example, watches a television program broadcast on the television set 142. In an alternate embodiment, the user 110 may watch a program previously recorded on the digital video recording device 144.

In one embodiment, the network-based television set 142 is coupled directly to the network 120 and is assigned specific identification information, such as, for example, a unique IP address, which identifies the user 110 and is dedicated to the user 110 during the session. Similarly, the digital video recording device 144 is also coupled directly to the network 120 and is further assigned specific identification information, such as, for example, a corresponding IP address. In an alternate embodiment, both the television set 142 and the digital video recording device 144 may be coupled to the network 120 via a network interface module 146, which may also be identified through a respective IP address.

In one embodiment, the user 110 accesses the entity 100 through the network-based television set 142 and the network 120 and initiates a login procedure using one or many known network protocols. In an alternate embodiment, the user 110 may choose to avoid the login procedure and just watch the respective programs on the television set 142.

In one embodiment, the actions of the user 110 are collected in data logs for further processing and are associated with the respective user identification information, such as the unique IP address and/or password information. If the user 110 is logged on to the entity 100, data is transmitted to the processing servers 104 within the entity 100. Alternatively, if the user is not logged on, data is stored at the television set 142 for subsequent transmission to the entity 100 upon receipt of a request from the web servers 102 of the entity 100.

In one embodiment, the processing servers 104 receive the user data and determine classification categories associated with each respective action performed by the user 110. If, for example, the user 110 watched a basketball game broadcast on the television set 142, the activity is assigned to a "sports" category and a "basketball" category. The user data and associated categories are further stored into respective category tables 220 and activity tables 230 within the data storage module 106 and are linked to the user profile of the user 110 stored within the user tables 210 based on the user identification information. Alternatively, the user data and associated categories may be stored at corresponding nodes within the data taxonomy 310 of the data storage module 106.

Referring back to FIG. 5, at processing block 420, advertisements related to the stored user actions or activities and their respective categories are transmitted to the user 110 to be displayed on the client machine 130 coupled to the user 110.

In one embodiment, subsequent to the actions detailed above, the user 110 accesses the entity 100 via the client machine 130 and the network 120 and initiates a login procedure with the entity 100. During the login procedure, the processing servers 104 within the entity 100 receive the user identification information, such as, for example, the unique IP address and/or password information, associated with the user 110.

In one embodiment, the user 110 further inputs various data and initiates multiple events or actions, such as, for example, advertisement clicks, search queries, search clicks, sponsored listing clicks, page views, advertisement views, or other types of events. The web servers 102 within the entity 100 transmit content information related to the user actions via the network 120 to be displayed on the client machine 130 for the user 110.

At the same time, classification categories related to previously stored action data are retrieved based on the user identification information and the stored user profile. In one embodiment, the processing servers 104 access respective tables within the data storage module 106 to retrieve the user profile and categories related to previously stored actions of the user 110 based on the user identification information.

In one embodiment, the advertising servers 105 communicate with the processing servers 104 to receive the user identification information and the retrieved classification categories. The advertising servers 105 within the entity 100 access respective tables within the advertising storage module 108 to retrieve advertisements related to the previously stored actions of the user 110 and the retrieved classification categories. Alternatively, the advertising servers 105 may access the advertising taxonomy 320 within the advertising storage module 108 to retrieve the corresponding advertisements.

For example, the advertising servers 105 may retrieve advertisements related to the "sports" and "basketball" categories associated with the programs viewed by the user 110, irrespective of the current events or actions performed by the user while logged on to the entity 100. The advertising servers 105 further transmit the retrieved advertisements to the user 110 to be displayed on the client machine 130 along with the content information requested by the user 110.

Figure 6:
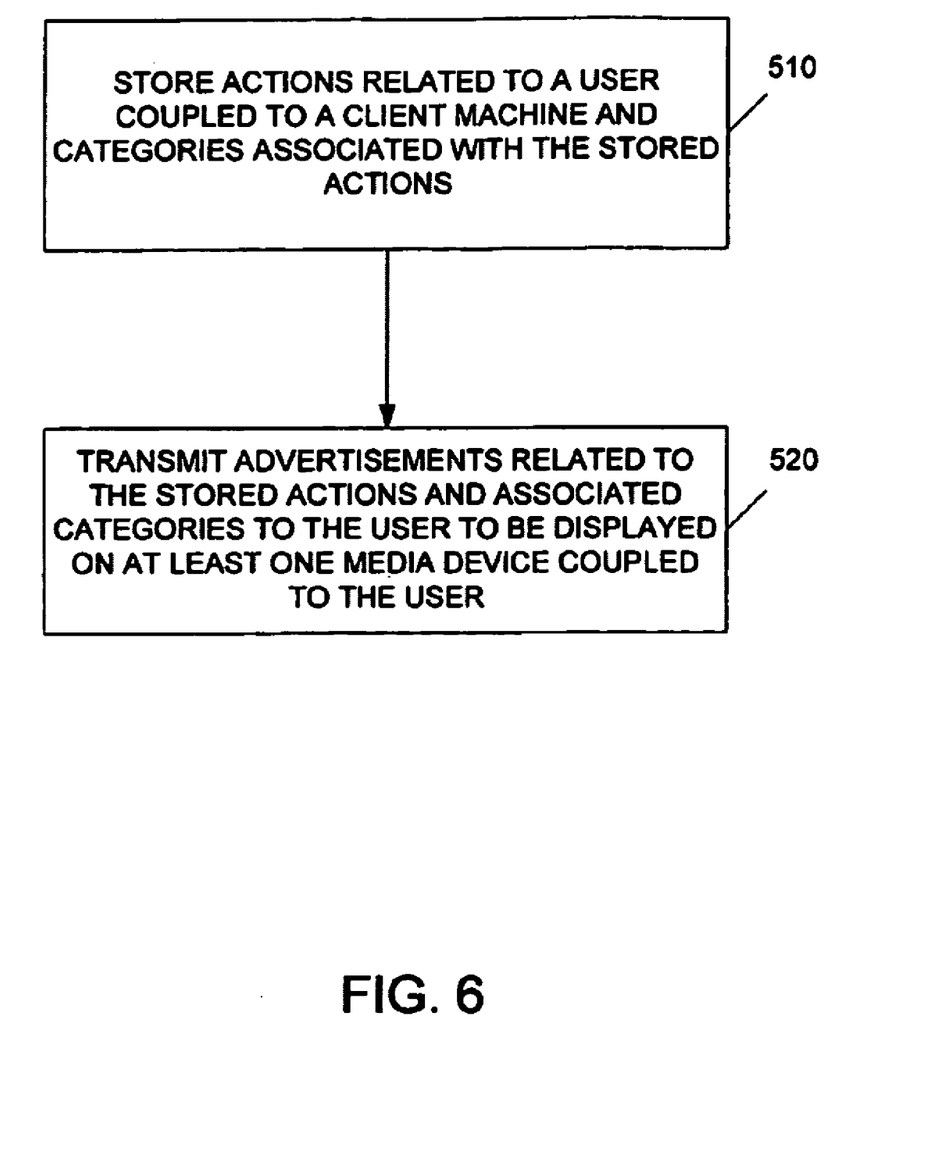
FIG. 6 is a flow diagram illustrating a method to facilitate targeting of advertisements based on mutual information sharing between devices over a network, according to an alternate embodiment of the invention.

FIG. 6 is a flow diagram illustrating a method to facilitate targeting of advertisements based on mutual information sharing between devices over a network, according to an alternate embodiment of the invention. As shown in FIG. 6, at processing block 510, events or actions related to a user 110 coupled to a client machine 130 and classification categories associated with the user events or actions are stored within the data storage module 106 of the entity 100.

In one embodiment, the user 110 accesses the entity 100 via the client machine 130 and the network 120 and initiates a login procedure with the entity 100. During the login procedure, the processing servers 104 within the entity 100 receive the user identification information, such as, for example, the unique IP address and/or password information, associated with the user 110.

In one embodiment, the user 110 further inputs various data and initiates multiple events or actions, such as, for example, advertisement clicks, search queries, search clicks, sponsored listing clicks, page views, advertisement views, or other types of events. The web servers 102 within the entity 100 transmit content information related to the user actions via the network 120 to be displayed on the client machine 130 for the user 110.

In one embodiment, the processing servers 104 receive the user data and determine classification categories associated with each respective event or action input by the user 110. If, for example, the user 110 requested a sports-related page, such as the ESPN web page related to basketball, the action is assigned to a "sports" category and a "basketball" category. The user data and associated categories are further stored into respective category tables 220 and activity tables 230 within the data storage module 106 and are linked to the user profile of the user 110 stored within the user tables 210 based on the user identification information. Alternatively, the user data and associated categories may be stored at corresponding nodes within the data taxonomy 310 of the data storage module 106.

Referring back to FIG. 6, at processing block 520, advertisements related to the stored user actions or activities and their respective categories are transmitted to the user 110 to be displayed on one or more media devices 140 coupled to the user 110.

In one embodiment, subsequent to the actions detailed above, the user 110 initiates a connection to the network 120 via one or more media devices 140 coupled to the user 110, such as the network-enabled television set 142 and/or the digital video recording device 144. Next, the user 110 performs various activities, such as, for example, watches a television program broadcast on the television set. In an alternate embodiment, the user 110 may watch a program previously recorded on the digital video recording device 144.

In one embodiment, the network-based television set 142 is coupled directly to the network 120 and is assigned specific identification information, such as, for example, a unique IP address, which identifies the user 110 and is dedicated to the user 110 during the session. Similarly, the digital video recording device 144 is also coupled directly to the network 120 and is further assigned specific identification information, such as, for example, a corresponding IP address. In an alternate embodiment, both the television set 142 and the digital video recording device 144 may be coupled to the network 120 via a network interface module 146, which may also be identified through a respective IP address.

In one embodiment, the user 110 accesses the entity 100 through the network-based television set 142 and the network 120 and initiates a login procedure using one or many known network protocols. In an alternate embodiment, the user 110 may choose to avoid the login procedure and just watch the respective programs on the television set 142.

In one embodiment, the processing servers 104 receive the user identification information and access respective tables within the data storage module 106 to retrieve classification categories related to previously stored actions of the user 110 based on the user identification information. The advertising servers 105 within the entity 100 receive the user identification information and the classification categories from the processing servers 104 and access the advertising storage module 108 to retrieve advertisements related to previously stored actions of the user 110 and their respective associated categories. Alternatively, the advertising servers 105 may access the advertising taxonomy 320 within the advertising storage module 108 to retrieve the corresponding advertisements.

For example, the advertising servers 105 may retrieve advertisements related to the "sports" and "basketball" categories associated with the web pages viewed by the user 110, irrespective of the current programs viewed by the user 110 on the television set 142. The advertising servers 105 further transmit the retrieved advertisements to the user 110 to be displayed on the television set 142 along with the television programs requested by the user 110.

In one embodiment, the advertising servers 105 may transmit the retrieved advertisements to the television set 142 to be displayed as banner advertisements during broadcast programs. Alternatively, the advertisements may be displayed as full screen advertisements between broadcast programs. In another alternate embodiment, the advertising servers 105 may transmit the retrieved advertisements to the digital video recording device 144 to be displayed as banner advertisements during viewing of previously recorded television programs.

Figure 7:
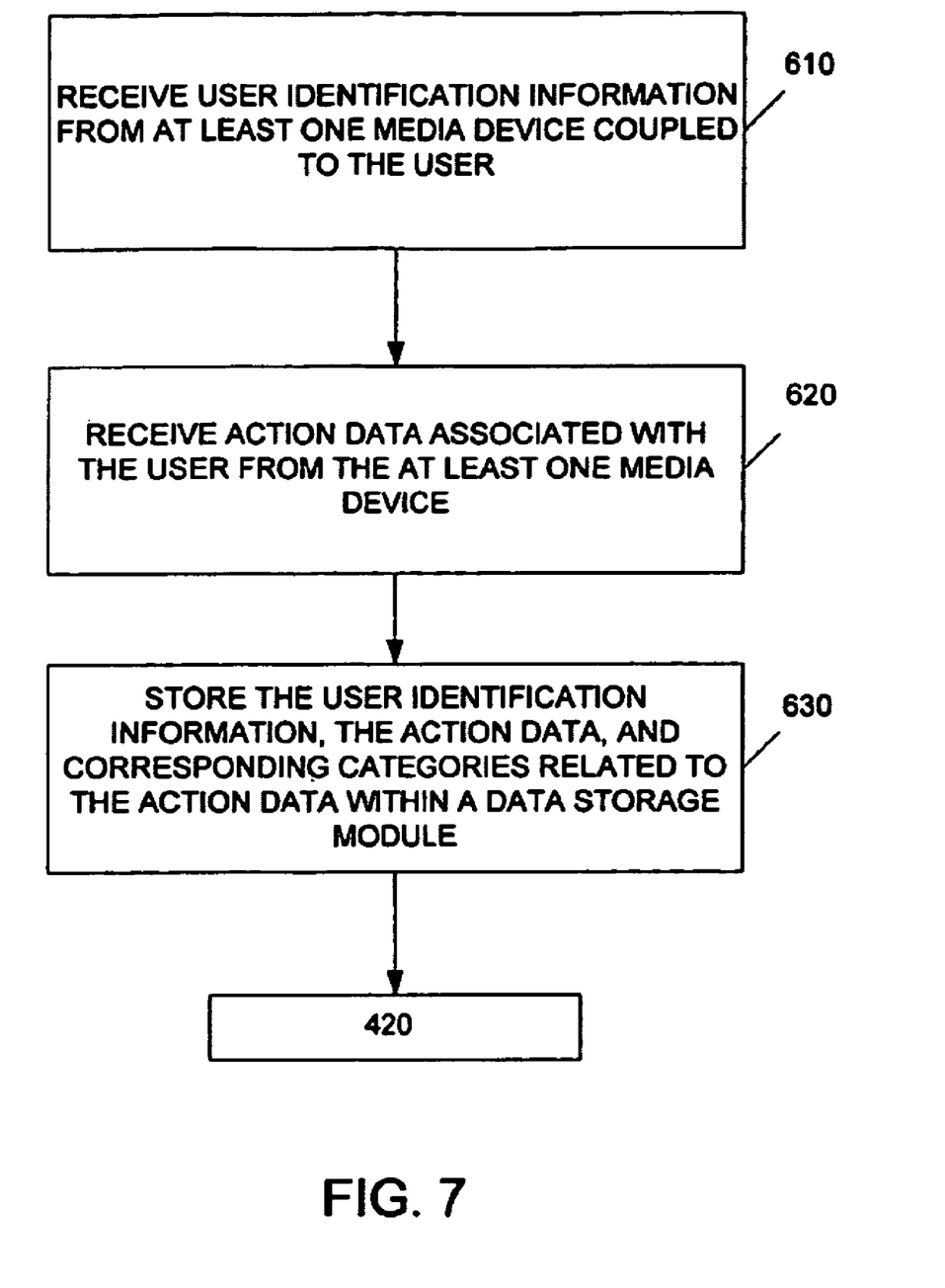
FIG. 7 is a flow diagram illustrating a method to process action information received at the network-based entity, according to one embodiment of the invention.

FIG. 7 is a flow diagram illustrating a method to process action information received at the network-based entity, according to one embodiment of the invention. As illustrated in FIG. 7, at processing block 610, user identification information is received from at least one media device 140 coupled to a user 110. In one embodiment, the processing servers 104 within the entity 100 receive the user identification information, such as, for example, an IP address associated with the user 110.

At processing block 620, action data associated with the user 110 is received from the one or more media devices 140. In one embodiment, the processing servers 104 within the entity 100 receive user data containing actions or activities performed by the user 110.

At processing block 630, the user identification information, the action data, and corresponding classification categories related to the action data are stored within a data storage module 106. In one embodiment, the processing servers 104 determine classification categories associated with each respective activity performed by the user 110.

The user data and associated categories are further stored into respective category tables 220 and activity tables 230 within the data storage module 106 and are linked to the user profile of the user 110 stored within the user tables 210 based on the user identification information. Alternatively, the user data and associated categories may be stored at corresponding nodes within the data taxonomy 310 of the data storage module 106. Next, the procedure jumps to processing block 420 described in detail in connection with FIG. 5.

Figure 8:
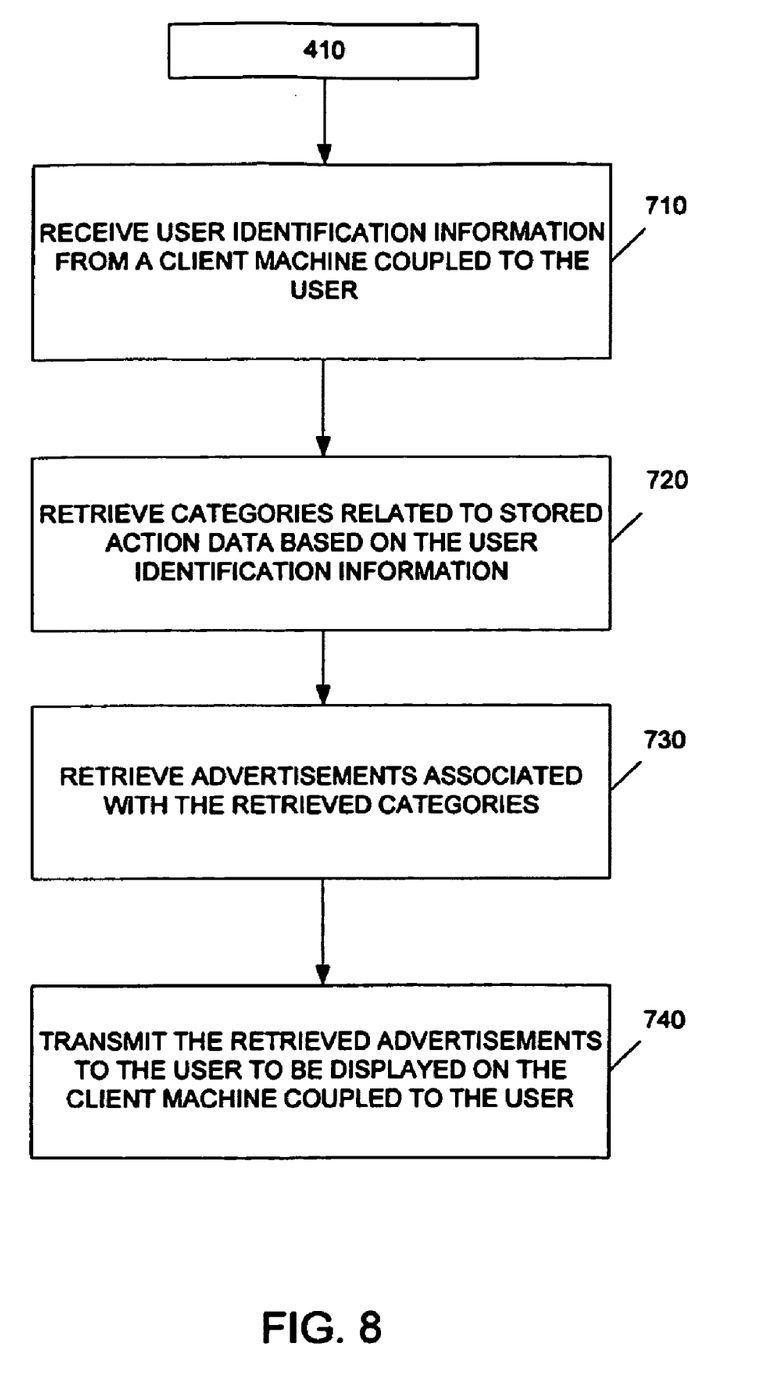
FIG. 8 is a flow diagram illustrating a method to facilitate matching of advertisements to the action information received at the network-based entity, according to one embodiment of the invention.

FIG. 8 is a flow diagram illustrating a method to facilitate matching of advertisements to the action information received at the network-based entity, according to one embodiment of the invention. As shown in FIG. 8, the procedure starts with processing block 410 described in detail in connection with FIG. 5. At processing block 710, user identification information is received from a client machine 130 coupled to a user 110. In one embodiment, the processing servers 104 within the entity 100 receive the user identification information, such as, for example, an IP address associated with the user 110.

At processing block 720, categories related to stored action data are retrieved based on the user identification information. In one embodiment, the processing servers 104 access respective tables within the data storage module 106 to retrieve categories related to previously stored actions of the user 110 based on the user identification information.

At processing block 730, advertisements associated with the classification categories are retrieved. In one embodiment, the advertising servers 105 within the entity 100 communicate with the processing servers 104 to receive the user identification information and the retrieved categories. The advertising servers 105 further access the advertising storage module 108 to retrieve advertisements related to the previously stored actions of the user 110 and the retrieved categories. Alternatively, the advertising servers 105 may access the advertising taxonomy 320 within the advertising storage module 108 to retrieve the corresponding advertisements.

At processing block 740, the retrieved advertisements are transmitted to the user 110 to be displayed on the client machine 130 coupled to the user 110. In one embodiment, the advertising servers 105 within the entity 100 further transmit the retrieved advertisements to the user 110 to be displayed on the client machine 130 along with the content information requested by the user 110.

Figure 9:
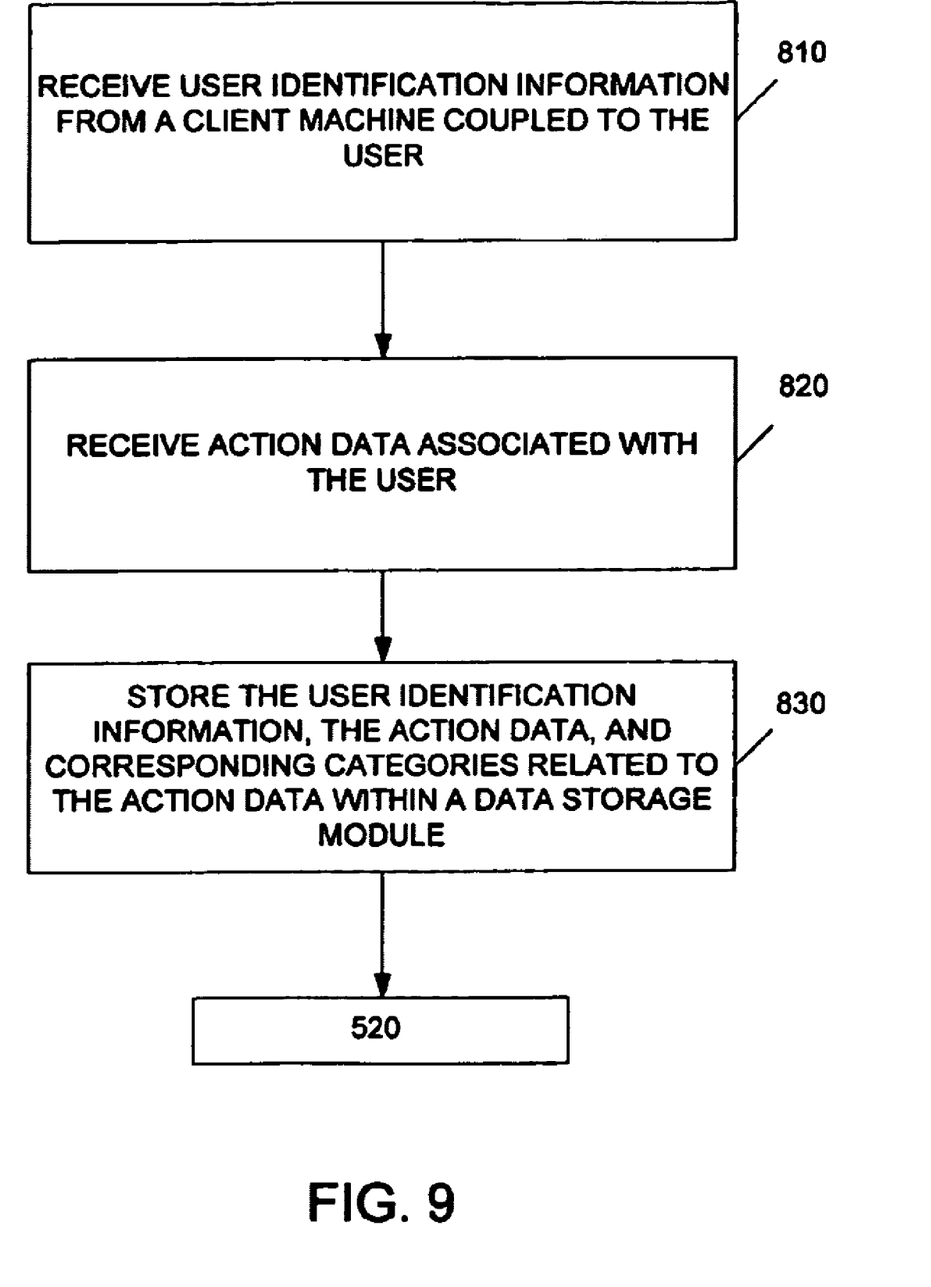
FIG. 9 is a flow diagram illustrating a method to process action information received at the network-based entity, according to an alternate embodiment of the invention.

FIG. 9 is a flow diagram illustrating a method to process action information received at the network-based entity, according to an alternate embodiment of the invention. As illustrated in FIG. 9, at processing block 810, user identification information is received from a client machine 130 coupled to a use 110. In one embodiment, the processing servers 104 within the entity 100 receive the user identification information, such as, for example, an IP address associated with the user 110.

At processing block 820, action data associated with the user 110 is received from the client machine 130. In one embodiment, the processing servers 104 within the entity 100 receive user data containing events or actions performed by the user 110.

At processing block 830, the user identification information, the action data, and corresponding classification categories related to the action data are stored within a data storage module 106. In one embodiment, the processing servers 104 determine classification categories associated with each respective event or action performed by the user 110.

The user data and associated categories are further stored into respective category tables 220 and activity tables 230 within the data storage module 106 and are linked to the user profile of the user 110 stored within the user tables 210 based on the user identification information. Alternatively, the user data and associated categories may be stored at corresponding nodes within the data taxonomy 310 of the data storage module 106. Next, the procedure jumps to processing block 520 described in detail in connection with FIG. 6.

Figure 10:
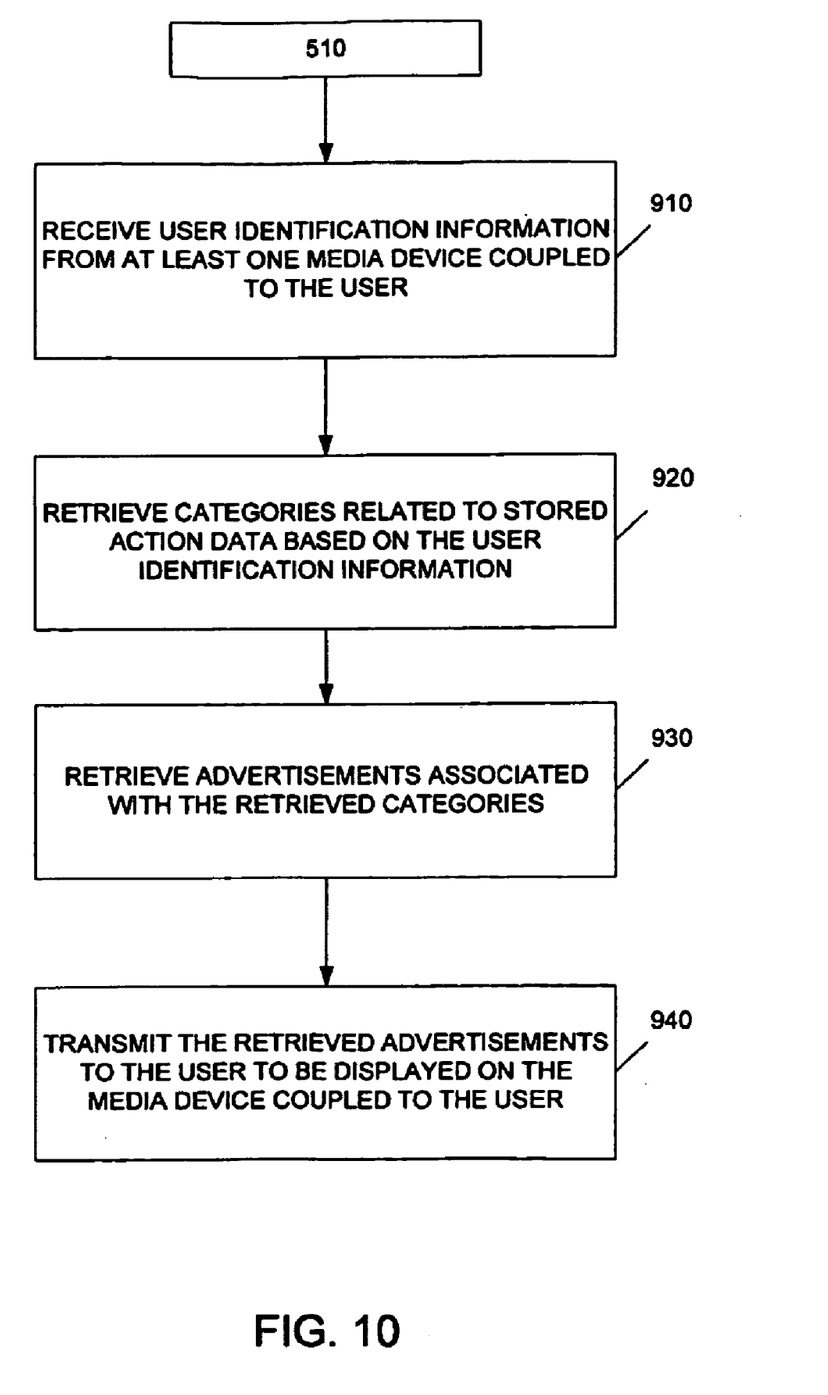
FIG. 10 is a flow diagram illustrating a method to facilitate matching of advertisements to the action information received at the network-based entity, according to an alternate embodiment of the invention.

FIG. 10 is a flow diagram illustrating a method to facilitate matching of advertisements to the action information received at the network-based entity, according to an alternate embodiment of the invention. As shown in FIG. 10, the procedure starts with processing block 510 described in detail in connection with FIG. 6. At processing block 910, user identification information is received from at least one media device 140 coupled to a user 110. In one embodiment, the processing servers 104 within the entity 100 receive the user identification information, such as, for example, an IP address associated with the user 110.

At processing block 920, categories related to stored action data are retrieved based on the user identification information. In one embodiment, the processing servers 104 access respective tables within the data storage module 106 to retrieve categories related to previously stored actions of the user 110 based on the user identification information.

At processing block 930, advertisements associated with the classification categories are retrieved. In one embodiment, the advertising servers 105 within the entity 100 communicate with the processing servers 104 to receive the user identification information and the retrieved categories. The advertising servers 105 further access the advertising storage module 108 to retrieve advertisements related to the previously stored actions of the user 110 and the retrieved categories. Alternatively, the advertising servers 105 may access the advertising taxonomy 320 within the advertising storage module 108 to retrieve the corresponding advertisements.

At processing block 940, the retrieved advertisements are transmitted to the user to be displayed on the one or more media devices 140 coupled to the user 110. In one embodiment, the advertising servers 105 within the entity 100 further transmit the retrieved advertisements to the user 110 to be displayed on one or more media devices 140 coupled to the user 110.

In one embodiment, the system and methods to facilitate matching of advertising information to actions and interests of users within a network, described in detail above in connection with FIGS. 2 through 10, may be used in a behavioral targeting system, which is configured to identify interests of users based on the users' online activities.

Figure 11:
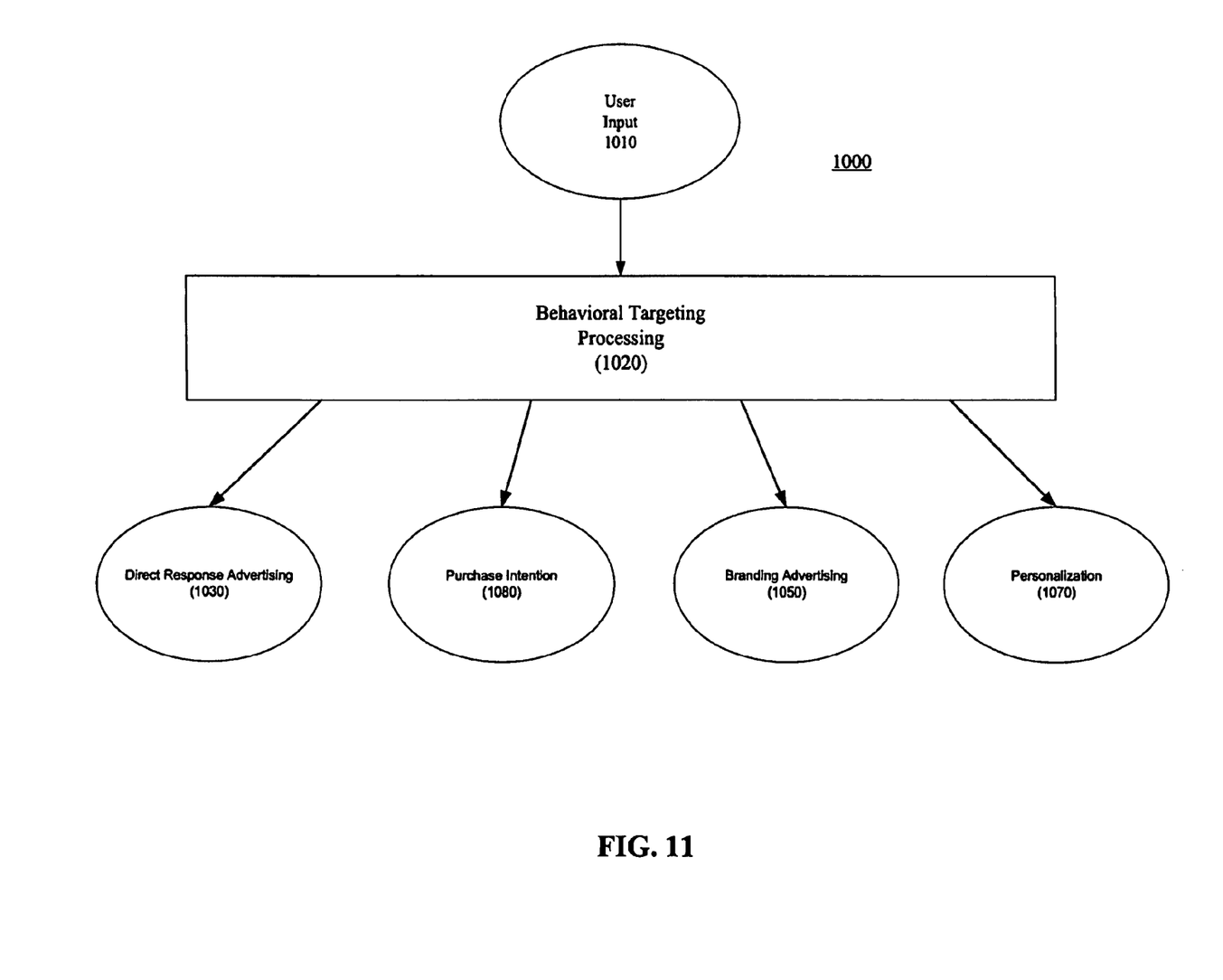
FIG. 11 is a block diagram illustrating a generalized behavioral targeting system.

FIG. 11 is a block diagram illustrating a generalized behavioral targeting system. The behavioral targeting system 1000 includes a behavioral targeting processing module 1020, which captures the user input 1010, such as, for example, one or more events. The behavioral targeting processing module 1020 generates a plurality of user interest profiles specific for a target objective. A user interest profile further provides an indication of interest in a subject matter for a particular objective. For example, the user profile output may indicate that the user is a good candidate for a particular objective regarding a "finance" topic, and a poor candidate for the specific objective regarding a "music" topic.

In one embodiment, the behavioral targeting processing module 1020 generates user interest profiles for marketing objectives. As shown in FIG. 11, the behavioral targeting system 1000 outputs user interest profiles for direct response advertising (1030), brand awareness advertising (1050), personalization activities (1070), and purchase intention activities (1080).

Figure 12:
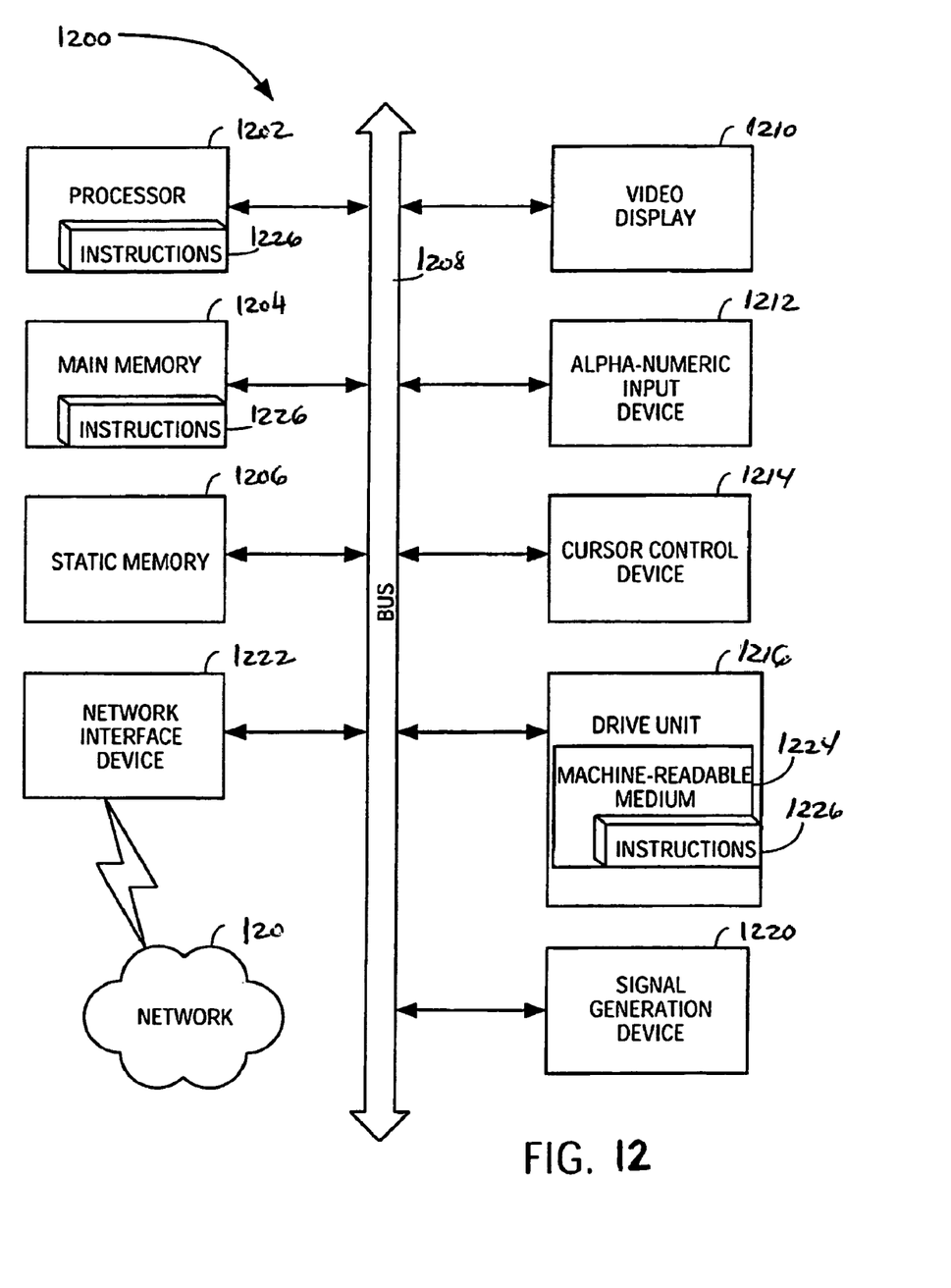
FIG. 12 is a diagrammatic representation of a machine in the exemplary form of a computer system within which a set of instructions may be executed.

FIG. 12 shows a diagrammatic representation of a machine in the exemplary form of a computer system 1200 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1200 includes a processor 1202, a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a disk drive unit 1216, a signal generation device 1218 (e.g., a speaker), and a network interface device 1220.

The disk drive unit 1216 includes a machine-readable medium 1224 on which is stored a set of instructions (i.e., software) 1226 embodying any one, or all, of the methodologies described above. The software 1226 is also shown to reside, completely or at least partially, within the main memory 1204 and/or within the processor 1202. The software 1226 may further be transmitted or received via the network interface device 1220 over the network 120.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:

storing action data associated with a user's actions in a data storage module, said action data being received from at least one network enabled-television set over a network, said action data further comprising an identification of content displayed on said network enabled-television set for viewing by said user;

selecting at least one advertisement using said action data for a user; and displaying said advertisement related to said user's actions on a Web page for download to said user's client computer over a network to be displayed on said client computer.

2. The method according to claim 1, further comprising:

receiving user identification information from said network enabled-television set; and receiving said action data associated with said user.

3. The method according to claim 2, wherein said storing further comprises:

storing said user identification information with said action data corresponding to said actions within said data storage module.

4. The method according to claim 2, further comprising requesting said user identification information and said action data from said network enabled-television set.

5. The method according to claim 1, further comprising:

analyzing each received action from said action data;

determining at least one predetermined classification category associated with said each received action; and storing said predetermined classification category with said action data within said data storage module.

6. The method according to claim 1, further comprising:

receiving user identification information over said network from said client computer;

retrieving predetermined classification categories from said data storage module based on said user identification information and a stored user profile; and retrieving said advertisements associated with said predetermined classification categories from an advertising storage module.

7. The method according to claim 1, wherein said at least one network enabled-television set further comprises a digital video recording device.

8. The method according to claim 1, wherein said at least one network enabled-television set is coupled to said network through a network interface device.

9. The method according to claim 2, wherein said user identification information further includes an Internet Protocol (IP) address assigned to said at least one network enabled-television set and dedicated to said user of said network enabled-television set.

10. An apparatus comprising:

processing servers to store action data associated with a user's actions in a data storage module, said action data being received from at least one network enabled-television set over a network, said action data further comprising an identification of content displayed on said network enabled-television set for viewing by said user and to select at least one advertisement using said action data for a user; and advertising servers coupled to said processing servers to display said advertisements related to said user's actions on a Web page for download to said user's client computer over a network to be displayed on said client computer.

11. The apparatus according to claim 10, wherein said processing servers further to receive user identification information from said network enabled-television set and said action data associated with said user.

12. The apparatus according to claim 11, wherein said processing servers further to store said user identification information with said action data corresponding to said actions within said data storage module.

13. The apparatus according to claim 11, wherein said processing servers further request said user identification information and said action data from said network enabled-television set.

14. The apparatus according to claim 10, wherein said processing servers further analyze each received action from said action data, determine at least one predetermined classification category associated with said each received action, and store said predetermined classification category with said action data within said data storage module.

15. The apparatus according to claim 14, wherein said processing servers to receive user identification information over said network from said network enabled-television set and further to retrieve said predetermined classification category from said data storage module based on said user identification information and a stored user profile, and wherein said advertising servers further to retrieve said advertisements associated with said predetermined classification categories from an advertising storage module.

* * * * *